United States Patent [19]

Edge

[11] 4,343,642

[45] Aug. 10, 1982

[54] METHOD FOR ATTENUATING FLOAT GLASS

[75] Inventor: Charles K. Edge, Sarver, Pa.

[73] Assignee: PPG Industries, Inc., Pittsburgh, Pa.

[21] Appl. No.: 174,481

[22] Filed: Aug. 1, 1980

[51] Int. Cl.³ .................................................. C03B 18/06
[52] U.S. Cl. ...................................... 65/99.5; 65/182.4
[58] Field of Search ............... 65/99 A, 182 R, 182 C, 65/99 A, 182.4

[56] References Cited

U.S. PATENT DOCUMENTS

| | | | |
|---|---|---|---|
| 3,266,880 | 8/1966 | Pilkington | 65/182.4 X |
| 3,520,672 | 7/1970 | Greenler et al. | 65/91 |
| 3,533,772 | 10/1970 | Itakura et al. | 65/182 |
| 3,563,720 | 2/1971 | Ito et al. | 65/182 |
| 3,661,548 | 5/1972 | Ito et al. | 65/182 |
| 3,709,673 | 1/1973 | Bishop | 65/182 R |
| 3,713,797 | 1/1973 | Lawrenson | 65/91 |
| 3,929,444 | 12/1975 | May et al. | 65/182 R |
| 3,998,616 | 12/1976 | Farabaugh | 65/29 |
| 4,157,908 | 6/1979 | Gagne | 65/99 |

FOREIGN PATENT DOCUMENTS 218377   4/1970   U.S.S.R. .......................... 65/99 A

*Primary Examiner*—Arthur D. Kellogg
*Attorney, Agent, or Firm*—Donald Carl Lepiane; Lee Patch

[57] ABSTRACT

The marginal edge portions of an accelerating ribbon of float glass are engaged by a plurality of opposed pairs of attenuating devices, each pair exerting substantially equal forces. The pairs of attenuating devices are positioned longitudinally adjacent one another such that the ratio of the ribbon width intermediate adjacent pairs to the average of the ribbon widths at each pair is greater than 0.95. The attenuating devices may be edge rolls each rotating with a peripheral velocity a predetermined amount greater than the linear velocity of the ribbon immediately upstream.

6 Claims, 4 Drawing Figures

METHOD FOR ATTENUATING FLOAT GLASS

FIELD OF THE INVENTION

This invention relates to a method of and an apparatus for controlling the width and thickness of a ribbon of glass being formed by a float process, and more particularly to an attenuating apparatus for and method of engaging the marginal edge portion of the ribbon to control its width and thickness.

DISCUSSION OF THE TECHNICAL PROBLEM

It is known in the art of manufacturing flat glass to float a body of molten glass upon a pool of molten metal and convey it thereacross to form a continuous ribbon. An unrestricted body of molten glass adopts an equilibrium thickness of about 0.27 inch (0.636 cm) upon tin, the most commonly employed molten metal, and stretching forces are required to produce thinner than equilibrium glass. Longitudinal stretching forces applied to the glass ribbon produce thinner than equilibrium glass, but also result in an undesirable decrease in ribbon width. Methods have therefore been developed to control the width of the glass ribbon while longitudinal stretching occurs by employing devices which engage opposite marginal edges of the ribbon to exert lateral retaining and stretching forces thereof.

In order to produce flat glass, and particularly thin flat glass, having acceptable optical quality it is desirable to produce a uniform stress field in the glass ribbon "Uniform stress field" as used herein refers to a condition where stress in the ribbon remains constant laterally across the ribbon at any selected location and changes longitudinally along the ribbon in a relatively smooth gradual manner, thus minimizing local variations in the stress field. Two important factors which affect the uniformity of the stress field in the glass are:

(a) the manner in which the tractive forces are applied to the ribbon; and (b) viscosity gradients that exist in the ribbon.

Because of an initial difference in longitudinal flow velocity between the marginal edge portions and the central portions, the glass ribbon generally exhibits an undesirable transverse temperature variation with a corresponding undesirable viscosity profile. Stress produced by an applied force is directly proportional to the viscosity of the ribbon at each point. The stress field therefore differs between the marginal edge portions and the central portions of the ribbon when lateral forces are applied to the marginal edge portions thereof.

U.S. Pat. No. 3,709,673 to Bishop, U.S. Pat. No. 3,929,444 to May et al, and U.S. Pat. No. 3,998,616 to Farabaugh each teach devices in which an elongated barrel is extended through a side wall of the float chamber over the pool of molten metal. A rotatable wheel, e.g. an edge roll, is mounted on one end of the barrel and engages the upper marginal edge of a glass ribbon to apply lateral and longitudinal tractive forces thereto to control the ribbon width. The other end of the barrel is supported outside the float chamber on convenient support mechanisms.

Although these devices are useful in controlling ribbon width, there are limitations associated with each because they apply lateral and longitudinal tractive forces at points approximately 10 feet apart along opposite marginal edges of the ribbon. The ribbon tends to be wide near the points of application of force with relatively high stress, and narrow between these points with relatively low stress, thus adopting a scalloped or undulatory configuration. This point application of force thus causes further nonuniformity in the stress field of the ribbon by introducing longitudinal variations therein. It is desirable therefore to apply lateral forces as closely together as possible along the marginal edge portions of the ribbon to approach a solid line of applied force, to improve stress field uniformity and obviate ribbon scalloping.

The prior discussed devices are unable to operate in the preferred close proximity for several reasons. First, the support mechanisms for the elongated barrels are generally wide, thus limiting how closely the barrels may be positioned. Secondly, in order to exert lateral forces to the ribbon with the edge rolls, the barrels must be inserted into the float chamber at an angle which is downstream of a line normal to the glass movement direction. This angular positioning further limits how closely the rotatable wheels can be spaced along the marginal edge portions of the ribbon. Further, the devices are limited because to increase the lateral component of the force applied by the edge roll, the downstream barrel angle must be increased by rotation about a pivot point located outside the chamber near the support mechanism. Any change in barrel angle results in considerable change in the position of the edge roll in relation to the ribbon, a condition which is preferably avoided due to ribbon perturbations and stress field variations which may result.

U.S. Pat. No. 3,520,672 to Greenler et al teaches an edge-engaging apparatus for producing float glass which uses multiple adjacent edge rolls, each mounted upon individual elongated barrels which extend through a side wall of the float chamber over the pool of molten metal. Greenler teaches that the edge rolls are driven at equal speeds by a common motor and drive chain positioned on the support mechanism outside the float chamber, and also that the edge rolls are driven at a linear speed that is increased towards the discharge end to maintain the ribbon under longitudinal tension to prevent buckling. Although this device allows for close proximity of edge rolls within the chamber, it has limitations. The support mechanism for this device occupies considerable space along the side wall of the float chamber, and greatly limits access thereto for maintenance and inspection. Further, Greenler fails to teach that the angle of each barrel can be changed to vary the force components exerted by the edge rolls. Still further, each individual barrel acts as a heat sink along the marginal edges of the float chamber, thus aggravating the already undesirable transverse temperature gradient and increasing nonuniformity in the stress field of the ribbon.

It would be advantageous to have an edge-engaging device and a method of operating same which avoids the limitations of the previously discussed devices.

SUMMARY OF THE INVENTION

The present invention relates to a method of controlling the width of a hot ribbon of glass which moves downstream through a chamber upon a pool of molten metal by engaging the ribbon on opposite marginal edge portions with a plurality of opposed pairs of attenuating devices, thus establishing a stress field in the ribbon. The ribbon naturally decreases in width in the space between adjacent opposed pairs of the attenuating devices. The present invention provides for positioning the opposed pairs of attenuating devices longitudinally spaced from one another such that the ratio of the ribbon width intermediate adjacent opposed pairs of attenuating devices to the average of the ribbon width at each of the opposed pairs is greater than 0.95, while simultaneously providing that each of the opposed pairs of attenuating devices exert equal forces to the ribbon to maintain uniformity of the ribbon stress field. Preferably adjacent opposed pairs of attenuating devices are spaced less than 5 feet (1.7 m) from one another, the attenuating devices being edge rolls, each rotated with a selected peripheral velocity relative to the linear velocity of the ribbon just upstream of each. As the ribbon accelerates downstream the edge rolls may be rotated with incrementally increasing peripheral velocities in the downstream direction, preferably a predetermined amount greater than the linear velocity of the ribbon just upstream of each edge roll, e.g. 5% to 10%. The invention also relates to an apparatus for practicing the width controlling method of the present invention.

DESCRIPTION OF THE INVENTION

The present invention relates to a method and apparatus for producing thinner than equilibrium float glass while maintaining the stress field of the ribbon as uniform as possible. Although not limited thereto, the invention may be practiced with and will be disclosed in relation to the device which forms the subject matter of U.S. patent application Ser. No. 174,480 filed even date herewith by John E. Sensi entitled "Apparatus & Method for Attenuating Float Glass" to exert substantially equal forces to the ribbon with each of the edge rolls 80 & 82 thus improving the uniformity of the stress field.

Figure 1:
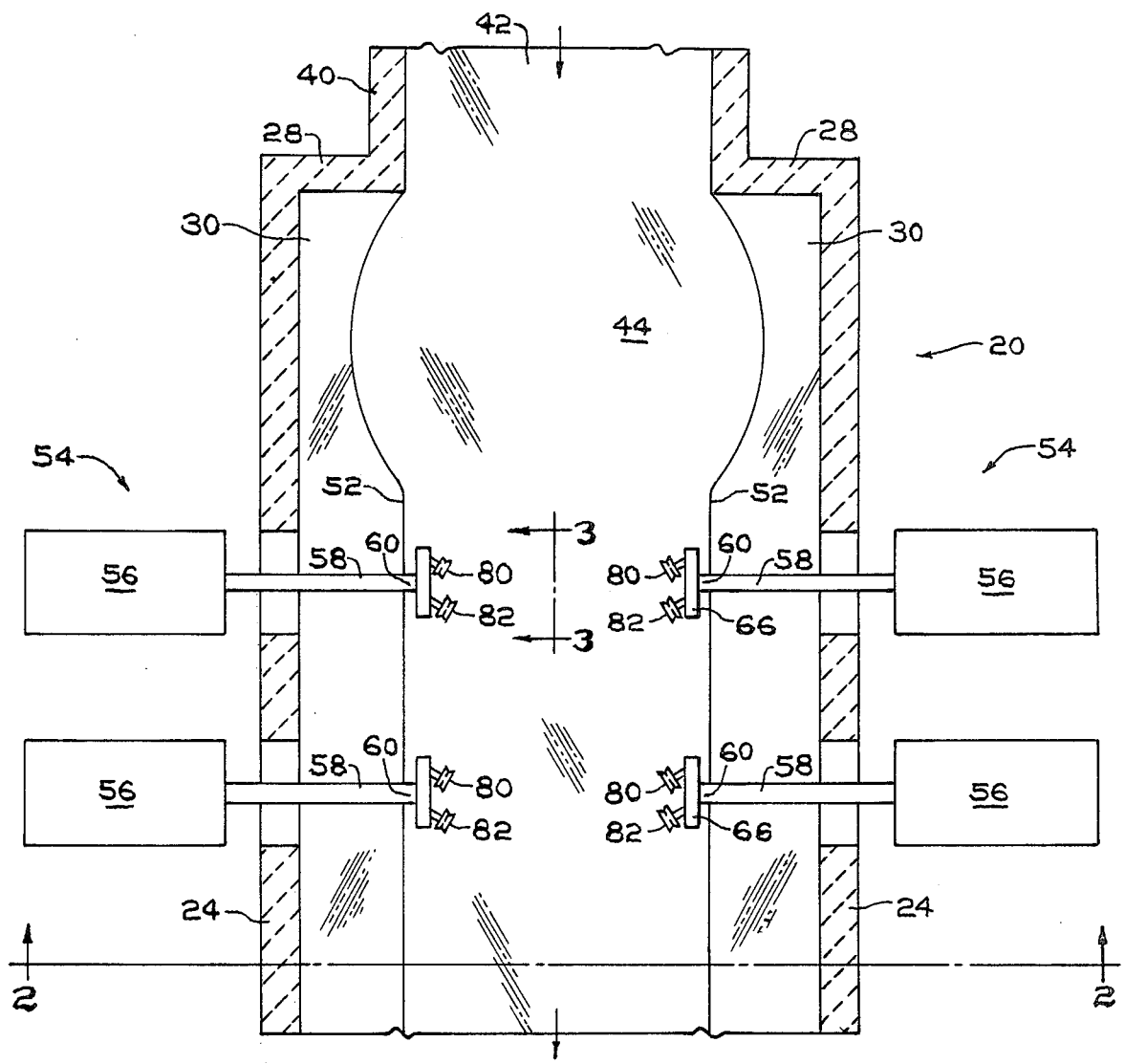
FIG. 1 is a fragmented plan view of a float chamber having portions removed for purposes of clarity illustrating edge-engaging devices incorporating features of the present invention.
Figure 2:
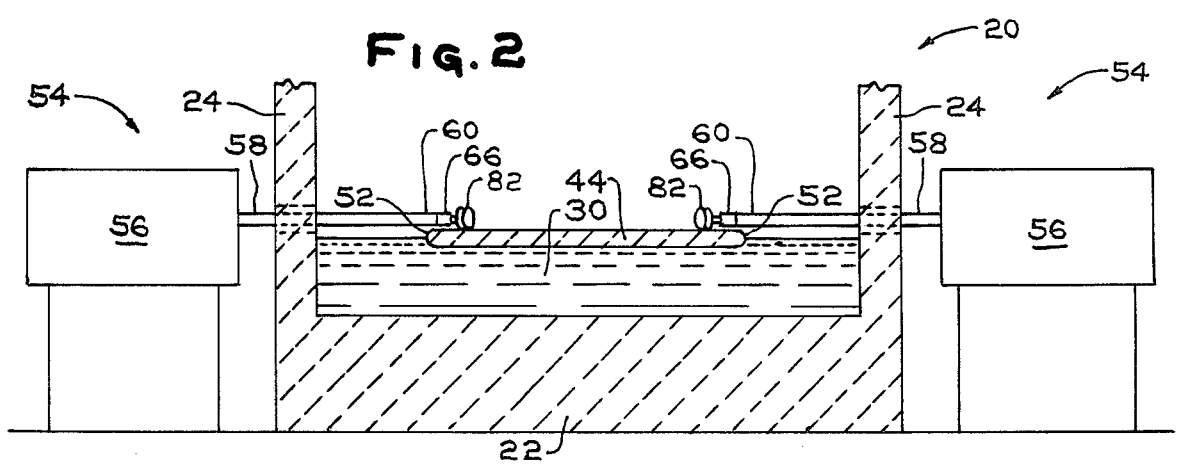
FIG. 2 is a view taken along lines 2—2 of FIG. 1.

Referring to FIG. 1, there is shown a section of the interior of a float chamber 20 of the type known in the glass manufacturing art. As illustrated in FIGS. 1 and 2, the chamber 20 includes a refractory bottom 22, refractory side walls 24, refractory exit lip (not shown), and refractory back walls 28 to form a container for containing a pool 30 of supporting molten metal, e.g., tin or an alloy of tin.

The chamber 20 is connected to a delivery channel 40 through which molten glass 42 is moved at a controlled rate in any convenient manner onto the pool 30 of molten metal to form a body of hot glass 44 on the molten metal pool 30. As the body of hot glass 44 moves downstream from the delivery channel 40 in the direction of the arrow it undergoes attenuation and cooling to form a dimensionally stable glass ribbon.

As will be appreciated, the instant invention is not limited to any particular type of forming chamber, the preceding being included to present an example environment in which the invention may be practiced.

"Attenuation" as used herein is defined as a controlled reduction in glass thickness accomplished by applying longitudinal and lateral forces to the marginal edges 52 of the body of hot glass 44 as the body of hot glass 44 moves downstream through chamber 20. Reduction in glass thickness may be accomplished with or without change in ribbon width.

Figure 4:
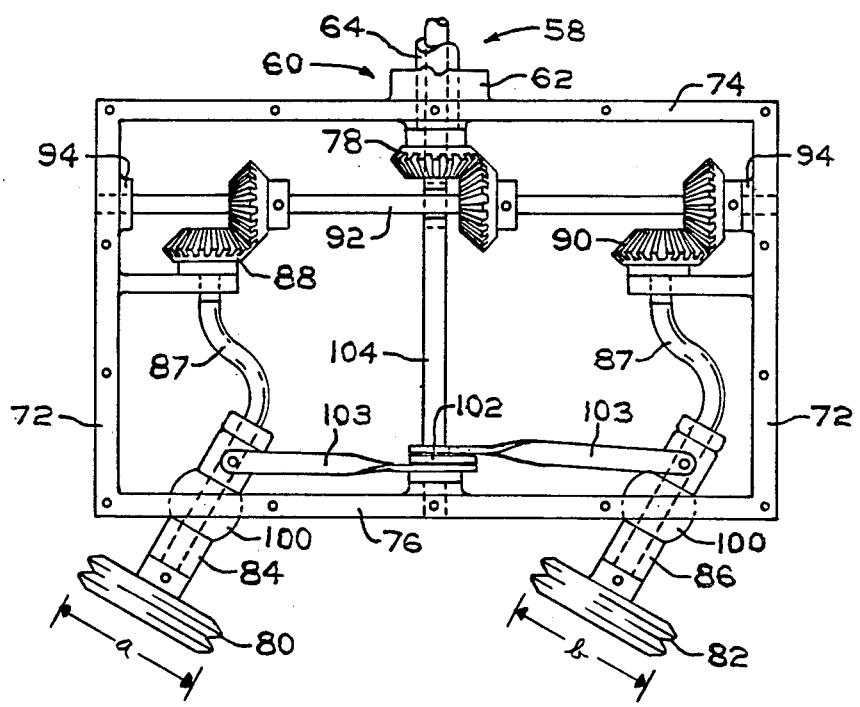
FIG. 4 is a sectional view taken along line 4—4 of FIG. 3 with portions removed for purposes of clarity.

Referring to FIG. 1, edge-engaging devices 54 incorporating features of the invention engage the marginal edge 52 of the body of hot glass 44, to establish and maintain a desired width and thickness of same. The edge-engaging devices 54 may be used to maintain the body of hot glass 44 at a thickness greater than or less than equilibrium thickness, but they are particularly beneficial in making glass of less than equilibrium thickness. The edge-engaging device 54 includes a structural support carriage 56 positioned outside the chamber 20 having movably mounted thereto one end of an elongated member 58 which extends through side wall 24 of chamber 20 over the pool 30 of molten metal. Referring to FIGS. 1 and 2, the elongated member 58 is mounted to the structural support carriage 56 in a manner which permits controllable adjustment of the position of the extended end 60 of elongated member 58 in all spatial directions. Mounting can be accomplished in any convenient manner, for example, by the teachings of U.S. Pat. No. 3,709,673 to Bishop, U.S. Pat. No. 3,929,444 to May et al, or U.S. Pat. No. 3,998,616 to Farabaugh, which teachings are herein incorporated by reference. As shown in FIG. 4, preferably the elongated member 58 is a tubular, fluid-cooled member having an outer tubular housing 62 and an inner rotatable hollow drive shaft 64 such as taught in U.S. Pat. No. 3,709,673 to Bishop, which teachings are hereby incorporated by reference.

Figure 3:
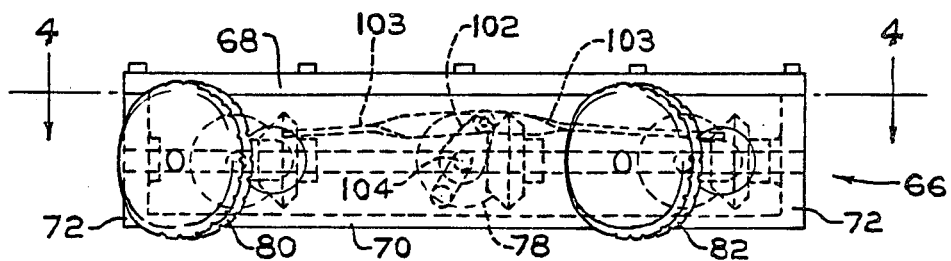
FIG. 3 is an enlarged elevational view taken along line 3—3 of FIG. 1.

Referring to FIGS. 3 and 4, a gear housing 66 is mounted at the extended end 60 of the elongated member 58 and communicates therewith in a manner and for purposes to be discussed below. The gear housing 66 is formed of a top wall 68, a bottom wall 70, side walls 72, a back wall 74, and front wall 76, which are interconnected to form a hollow chamber. The outer tubular housing 62 of elongated member 58 is rigidly attached to the exterior of back wall 74. The inner hollow drive shaft 64 is elongated member 58 extends into the interior of gear housing 66 and is rigidly attached therein to drive gear 78.

Edge rolls 80 and 82 are rotatably attached to front wall 76 by hollow shafts 84 and 86 respectively, which extend therethrough into the interior of gear housing 66. As illustrated in FIG. 3, the edge rolls 80 and 82 rotate through a circular path having a portion below bottom wall 70 to engage the glass ribbon.

Interior ends of hollow shafts 84 and 86 are operatively connected by flexible drive shafts 87 to gears 88 and 90 respectively, which in turn are operatively connected to drive gear 78 by geared shaft 92. As shown in FIG. 3, geared shaft 92 is rotatably mounted between drive gear 78 and gears 88 and 90 by bushings 94, and effectively transfers driving force from drive gear 78 to glass-engaging wheels 80 and 82. The drive gear 78 is driven by the rotation of inner hollow shaft 64, which in turn is driven by a motor (not shown) positioned outside the float chamber on structural support carriage 56.

Hollow shafts 84 and 86 are conveniently mounted in front wall 76 to allow rotary motion about their longitudinal center lines, and also to permit angular adjustment of their longitudinal axis in relation to the front wall 76 and/or to the longitudinal center line of the elongated member 58. For example and with continued reference to FIGS. 3 and 4, hollow shafts 84 and 86 may be mounted within front wall 76 by ball and socket assemblies 100 which provide a bearing surface for free rotation therein and permit angular adjustment of the hollow shafts 84 and 86. A pivotally mounted linkage assembly 102 links a connecting rod 103 and a control rod 104 to operatively connect the interior ends of the hollow shafts 84 and 86 for coordinated angular adjustment from outside the chamber side wall. Flexible drive shafts 87 acting in cooperation with ball and socket assemblies 100 permit hollow shafts 84 and 86 to rotate within a range of angular relationships with respect to the longitudinal center line of elongated member 58, the particular angular relationship selectively controllable by adjustment of linkage assembly 102, connecting rod 103, and control rod 104.

Although not limiting to the invention, the edge engaging device 54 may be fluid cooled as taught in the Bishop patent. For example, drive gear 78 and gears 88 and 90 may have hollow centers, and cooling fluid may be conveniently directed through drive shaft 64 into gear housing 66, directed into and out of edge rolls 80 and 82, and removed through the area between the outer tubular housing 62 and the drive shaft 64.

Edge rolls 80 and 82 may engage the top surface of the ribbon as taught in the above-referenced Bishop patent, or as taught in U.S. Pat. No. 3,661,548 to Ito et al, which teachings are herein incorporated by reference. Alternatively, the edge rolls 80 and 82 may engage the bottom surface of the ribbon, as taught in U.S. Pat. No. 3,533,772 to Itakura et al, which teachings are herein incorporated by reference. Although not limiting to the invention, the preferred edge rolls are top edge rolls as described in the Bishop patent and as shown in FIGS. 1-4.

Referring now to FIGS. 1 and 2, in a preferred mode of installation a pair of edge engaging devices 54 are inserted simultaneously from opposite sides of the chamber 20, and if more than one pair are to be used, installation is begun at the most upstream pair. The discussion to follow will relate to the installation of a single-edge engaging device 54, it being understood that similar steps are simultaneously enacted upon the other one of the opposed pair.

Prior to insertion, the cooling system of the device 54 should be checked for proper fluid flow, after which appropriate openings are made in the sidewall 24 by removing side seal members. The elongated member 58 is inserted into the chamber substantially normal to the glass movement direction, and edge rolls 80 and 82 are energized to rotate at a peripheral speed approximately equal to the linear speed of the ribbon at that location and in a direction substantially parallel to the marginal edge thereof. Edge rolls 80 and 82 are then biased lightly against the upper surface of the ribbon.

After engagement, the peripheral speed and the depth of engagement of edge rolls 80 and 82 are generally increased to exert the desired longitudinal tractive force to the ribbon. Thereafter, the axis of rotation of edge rolls 80 and 82 is adjusted (generally in a direction downstream of a line normal to the direction of ribbon movement, to supply a lateral stretching force) while maintaining elongated member 58 stationary, and the peripheral speed is again adjusted correspondingly to maintain the previously established longitudinal component. In this configuration, edge rolls 80 and 82 exert both longitudinal and lateral forces to the glass 44 when driven by the drive gear 78. Longitudinal forces are exerted to attenuate the ribbon, and lateral forces are exerted to resist the ribbon's natural narrowing tendency and to control the ribbon width. As can be appreciated, the lateral component of the tractive force may be increased, and the longitudinal component of the tractive force correspondingly decreased, by increasing the downstream angle of the axis of rotation of the edge rolls 80 and 82. In previous edge-engaging devices this angle change was produced by pivoting the barrel about a point outside the float chamber. The large distance between pivot point and edge roll caused a considerable change in position of the edge roll with respect to the ribbon, with resulting perturbations and stress field variations in the glass. The present device provides for pivoting the edge roll about a point near the front wall 76 of housing 66, thus causing only a slight position change in the edge roll and effectively eliminating said difficulties.

Edge rolls 80 and 82 may be positioned at equal angles with respect to the elongated member 58, or may by adjustment of linkage 102 and rod 103 be operated at different angles with respect thereto. Alternatively, edge rolls 80 and 82 may be angularly operated independently of one another by providing multiple linkages and control rods. Further, edge rolls 80 and 82 may be pivoted in a vertically oriented plane with respect to the elongated member 58 to vary their depth of engagement with the ribbon.

The discussion will now specifically be directed to the subject matter of the present invention. To produce superior thinner than equilibrium thickness float glass, it is desirable to maintain the stress field of the ribbon as uniform as possible. Attenuation must therefore be accomplished in a smooth gradual manner, i.e., with substantially constant acceleration of the ribbon. In accordance with this ideal, the present invention provides a method of and apparatus for exerting substantially equal forces to the marginal edge portions of a ribbon with each of a plurality of edge rolls while minimizing ribbon width variations therebetween.

Accordingly, and with reference to FIGS. 1-4, the downstream edge roll 82 is caused to rotate with a preselected slightly greater peripheral velocity than the upstream edge roll 80. Referring to FIGS. 3 and 4, one embodiment of the present invention provides a preselected larger circumferential dimension for edge roll 82 than for edge roll 80, i.e., dimension "b" is greater than dimension "a" in FIG. 4, with all gearing within gear housing 66 the same for both edge rolls. This embodiment produces equal angular velocities for both edge rolls, but a variant in the peripheral velocities.

Alternatively, with continued reference to FIGS. 3 and 4, edge rolls 80 and 82 are provided with equal circumferential dimensions, i.e., dimension "b" is equal to dimension "a" in FIG. 4, but gear 88 differs from gear 90, to yield a greater angular velocity for edge roll 82 than for edge roll 80.

In a preferred mode of operation, the variant in peripheral velocities is established at about 5%–10%, i.e., edge roll 82 has a peripheral velocity in the range of 5%–10% greater than the peripheral velocity of edge roll 80 and the peripheral velocity of edge roll 80 is adjusted to be about 5%–10% greater than the velocity of the hot glass 44 just upstream of edge roll 80. In this way edge roll 80 is able to effect a small incremental stretching of the hot glass 44, followed shortly thereafter by a second substantially equal incremental stretching by edge roll 82.

A plurality of such operatively interconnected edge rolls may be closely spaced longitudinally along the marginal edge portion of the ribbon to approximate a line application of force, each edge roll incrementally increasing in peripheral velocity but exerting substantially equal forces.

As discussed supra, the internal forces of the ribbon cause a decrease in ribbon width between adjacent opposed pairs of edge rolls. The present invention provides the means for positioning adjacent edge rolls along the marginal edge portion of the ribbon to minimize this effect such that the maximum width decrease between adjacent opposed pairs of edge rolls does not exceed 5% of the average of the ribbon widths at each of the adjacent pairs, i.e. the ratio of the minimum ribbon width between opposed pairs to the average of the ribbon widths at each pair is greater than 0.95. Preferably the adjacent opposed pairs of edge rolls are spaced less than about 5 feet (1.7 m) from one another, and more preferably 3 to 4 feet, the particular distance determined in part by the temperature of the ribbon at the subject location. The magnitude of the preselected variant in peripheral velocities will correspondingly depend upon the distance between adjacent edge rolls. In this manner, attenuation is accomplished, ribbon width is carefully controlled, and the ribbon stress field is maintained as uniform as possible to yield good optical properties in the ribbon.

The relative increase in peripheral velocities of the edge rolls may be preselected by the choice of gears and/or circumferential dimensions of the edge rolls 80 and 82. Minor adjustments in the forces exerted by each edge roll can be accomplished by varying the angle of engagement of each, thus altering the longitudinal and lateral components of force, or by varying the depth of engagement of the edge roll with the glass.

As can be appreciated, the instant invention is not limited to the number of edge rolls employed in the specific embodiment set forth herein, but by the claims which follow.

I claim:

1. In a method of attenuating a ribbon of glass by a plurality of opposed pairs of attenuating devices spaced longitudinally within an attenuating zone of a flat glass forming chamber, each of said attenuating devices engaging adjacent marginal edge portions of the ribbon as the ribbon advances downstream through the attenuating zone upon a pool of molten metal toward a discharge end of said chamber, the ribbon having internal forces which tend to maintain the ribbon in an equilibrium condition and resist attempts to attenuate the ribbon from its equilibrium condition, wherein said attenuating devices are spaced and actuated to exert longitudinal and lateral attenuation forces on the ribbon which act against the internal forces of the ribbon to generate non-uniform longitudinal and lateral stresses in the ribbon within the attenuating zone, which non-uniform longitudinal and lateral stresses detrimentally affect the optical quality of the final ribbon, the improvement comprising practicing the steps of:

longitudinally spacing said plurality of opposed pairs of attenuating devices in such proximity relative to one another in said attenuating zone such that the width of the ribbon is maintained between adjacent pairs of attenuating devices at least about 95 percent of the average ribbon width measured at said adjacent opposed pairs of attenuating devices; and rotating said plurality of opposed pairs of attenuating devices with progressively increasing rotational speeds relative to the preceding opposed pair to accelerate the engaged portions of said ribbon with each of said plurality of opposed pairs of attenuating devices, wherein each of said plurality of opposed pairs of attenuating devices is rotated with a rotational speed which has a corresponding longitudinal component of velocity which is a predetermined amount $\Delta V$ greater than the longitudinal velocity of the ribbon as measured immediately upstream from each of said opposed pairs wherein, the predetermined amount $\Delta V$ is maintained substantially equal for each of said plurality of opposed pairs of attenuating devices to minimize non-uniformities in the longitudinal stresses in the ribbon in the attenuating zone.

2. The method as set forth in claim 1, further comprising the step of:

adjusting the rotational speed in combination with the angular orientation of each of said opposed pairs of attenuating devices to maintain said substantially equal $\Delta V$ while altering the lateral component of velocity of said opposed pairs sufficient to minimize non-uniformities in the lateral stresses of the ribbon.

3. The method as set forth in claim 2, wherein the longitudinal component of velocity of each attenuating device is between about 5% and 10% greater than the longitudinal velocity of the ribbon measured immediately upstream of each of said attenuating devices.

4. The method as set forth in claim 3 wherein the attenuating devices comprise edge rolls having incrementally increasing circumferential dimensions from the upstream pair to the downstream pair and wherein said rotating step includes:

rotating said edge rolls at substantially equal angular velocities.

5. The method as set forth in claim 3 wherein the attenuating devices comprise edge rolls having substantially equal circumferential dimensions and wherein said rotating step includes:

rotating said edge rolls at incrementally increasing angular velocities from the upstream pair toward the downstream pair.

6. The method as set forth in claim 1 or 3 wherein each of said attenuating device includes a single elongated fluid cooled member having an interior end in said chamber and an exterior end outside said chamber, and wherein the ribbon has an undesirable transverse temperature profile which is aggravated by the extraction of heat from said chamber through said fluid cooled member, further comprising the step of:

mounting a plurality of edge rolls adjacent the interior end of the single elongated fluid cooled member spaced from one another longitudinally relative to a marginal edge portion of the ribbon prior to practicing said longitudinally spacing and rotating steps, wherein said mounting step is practiced in a manner to reduce the amount of heat extracted from the marginal edge portions of said ribbon through said single fluid cooled member to a level less than that which would be extracted by a plurality of similar elongated fluid cooled members each supporting one of said plurality of mounted edge rolls, to reduce the effect of practicing said longitudinal spacing and rotating steps upon said transverse temperature profile.

* * * * *

UNITED STATES PATENT AND TRADEMARK OFFICE
CERTIFICATE OF CORRECTION

PATENT NO. : 4,343,642

DATED : August 10, 1982

INVENTOR(S) : Charles K. Edge

It is certified that error appears in the above-identified patent and that said Letters Patent are hereby corrected as shown below:

Claim 6, column 8, line 45, "device" should be --devices--.

Signed and Sealed this

Thirtieth Day of November 1982

[SEAL]

Attest:

GERALD J. MOSSINGHOFF

Attesting Officer

Commissioner of Patents and Trademarks